May 30, 1972 L. C. MINNEMAN 3,666,434
GLASS SHAPING
Filed Nov. 30, 1967 2 Sheets-Sheet 1
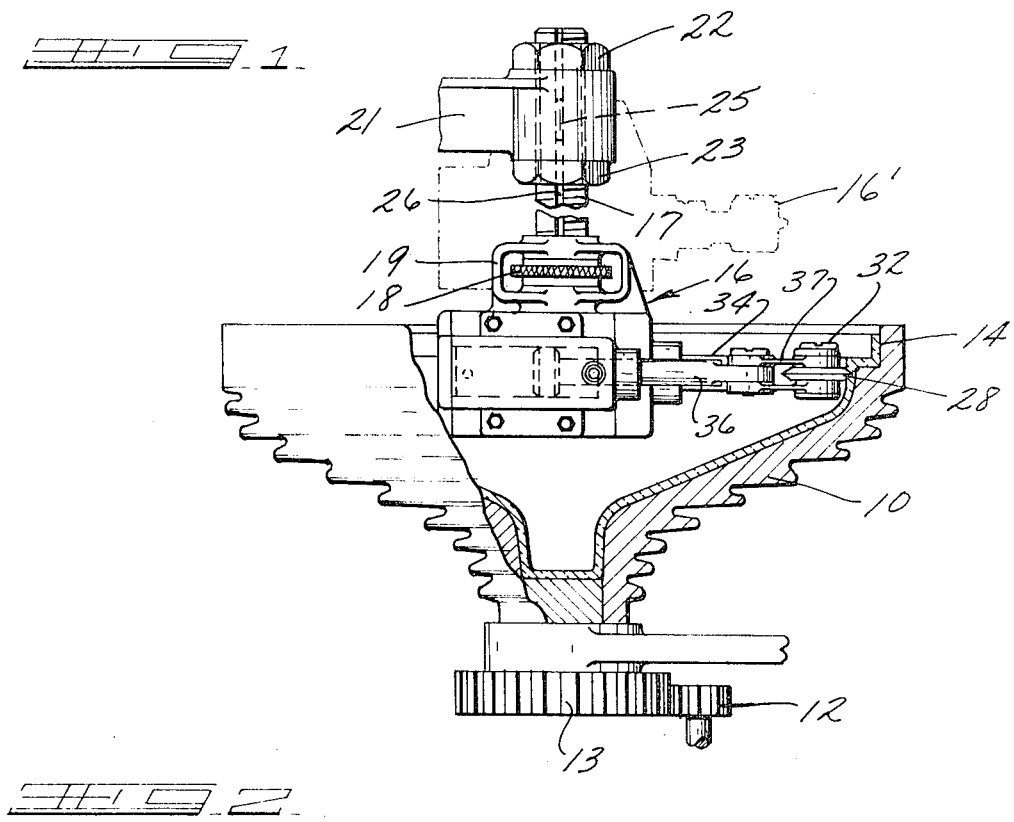
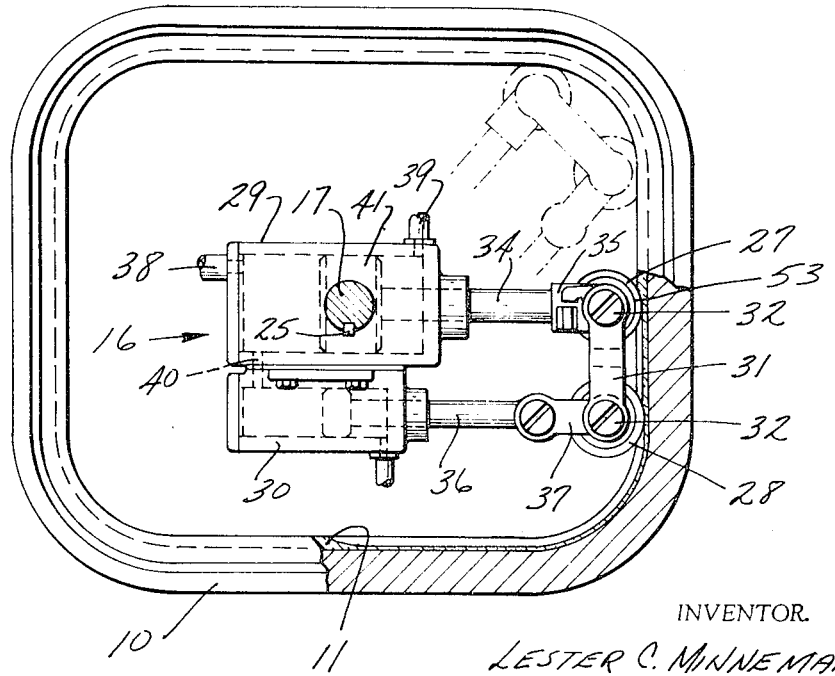
INVENTOR.
LESTER C. MINNEMAN
BY E. J. Holler &
W. A. Schaich
ATTORNEYS

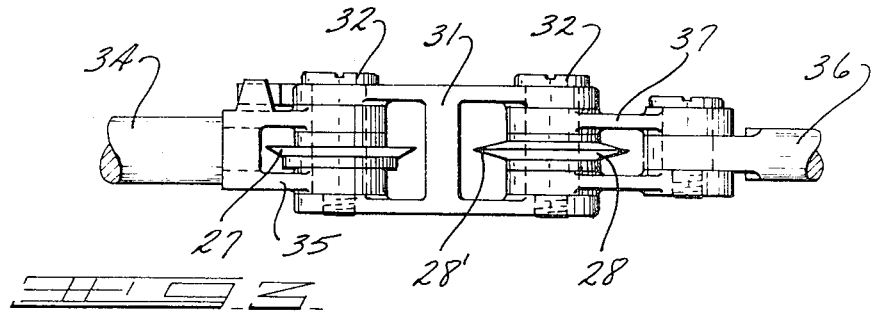
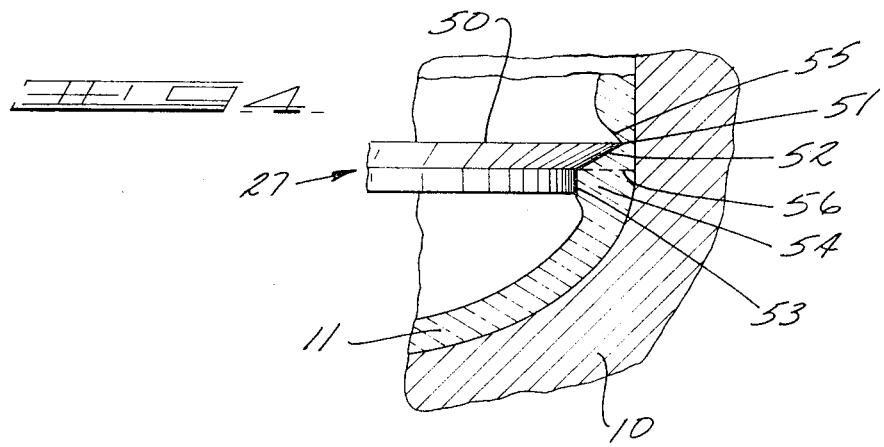
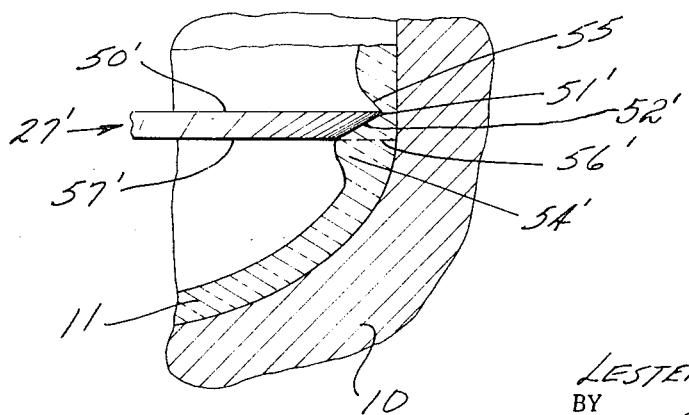

United States Patent Office 3,666,434
Patented May 30, 1972

3,666,434
GLASS SHAPING
Lester C. Minneman, Maumee, Ohio, assignor to
Owens-Illinois, Inc.
Filed Nov. 30, 1967, Ser. No. 686,920
Int. Cl. C03b *33/10*
U.S. Cl. 65—177
2 Claims

ABSTRACT OF THE DISCLOSURE

An improvement in cathode-ray tube forming techniques wherein a glassworking tool, employed in conjunction with a centrifugal casting operation, is provided with a glass plowing surface to facilitate the formation of a wide annular seal edge on the funnel member.

BACKGROUND OF THE INVENTION

This invention generally relates to the art of glass-severing; more particularly it relates to annularly grooving and reshaping a hollow glass article during its formation as a preliminary step in the process of removing a moil portion by grooving and scoring to assist the development of thermally-induced stresses.

Briefly stated, one method of producing hollow generally frusto-conical shaped glass articles, such as television picture tube envelopes, consists of forming a funnel member and subsequently sealing a faceplate thereto. Generally, the funnel member is formed by introducing a charge of molten glass into an open-topped vertically-aligned mold and rotating the mold at a high speed, whereby the glass climbs upwardly and outwardly on the internal mold surfaces to produce the required frusto-conical shape. Unfortunately, the funnel members produced by this technique, as well as those produced by an alternate method which employs a pressing operation immediately prior to the mold rotation, have an irregularly-shaped upper surface which precludes or limits proper faceplate sealing thereto other than by fusion. Consequently, supplemental manufacturing methods have been devised to produce a more desirable upper funnel surface which will allow proper faceplate sealing such as by an annular layer of low-melting sealant.

Typically, these supplemental methods include the steps of creating a circumferential scored groove in the interior surface of the hollow glass article and subsequently, by thermally-induced stresses, allowing the moil portion to separate from the body portion of the article; the upper rim surface of the body portion then being ground to produce a substantially flat sealing surface. U.S. Pats. 2,662,289; 2,629,206 and 2,840,952 disclose methods and apparatus for accomplishing the grooving of the interior surface by use of beveled rollers or discs, the latter being directed to both grooving and scoring of the glass sidewall for uniform severance. The lateral surfaces of these discs consist of two merging faces, both inclined with respect to the disc axis, which define a circumferential knife edge. While these discs have functioned well for their intended purpose of facilitating the ringing-off operation by thermally-induced stresses, where the glass is scored to develop an annular pattern of small scores or fissures, they all result in the production of a funnel member having an upper rim whose radial thickness is substantially the same as that of the funnel sidewall prior to the scoring operation. Those skilled in the art readily appreciate the fact that if a wider or thicker rim could be easily provided on the funnel member as formed by a spinning or combined pressing and spinning process, sealing of the faceplate thereto would be greatly facilitated.

SUMMARY OF THE INVENTION

In accordance with this invention, there is provided an improvement in the methods and apparatus for producing funnel members of television picture tube envelopes. More particularly, there is provided an improvement in the grooving and scoring operations heretofore used, wherein the grooving tool, in addition to accomplishing a grooving function, also reshapes the adjacent glass of the body portion to form a radially-thickened annular bead or ring which, by suitable after-processing, provides the funnel with a wide seal edge.

Yet more particularly, there is provided in accordance with this invention a glassworking tool having a single surface inclined with respect to the tool axis whereby, in a plowing type manner, glass disposed outwardly adjacent this surface will be forced downwardly to form a radially thickened bead on the body portion side as the tool substantially penetrates the article sidewall during the grooving-reshaping operation.

BRIEF DESCRIPTION OF THE DRAWINGS

The foregoing and other advantageous features of this invention will become apparent to those skilled in the art upon reference to the drawings, of which:

FIG. 1 is a fragmentary vertical sectional view of an apparatus for forming and grooving a hollow article while the glass is in a workable state;

FIG. 2 is a fragmentary plan view of the apparatus of FIG. 1;

FIG. 3 is an enlarged fragmentary vertical view showing the linkage for supporting the grooving and scoring tools;

FIG. 4 is a further enlarged fragmentary sectional view showing a preferred embodiment of this invention; and FIG. 5 is a fragmentary sectional view similar to FIG. 4 showing an alternate embodiment of this invention.

DESCRIPTION OF THE PREFERRED EMBODIMENT(S)

Referring to FIGS. 1 and 2, a mold 10 is shown in which the glass funnel member 11 of a television picture tube envelope is formed by rotation about its vertical axis. Rotation of the mold is effected by power supplied through a driving pinion 12 which drives a gear 13 connected to the mold. When a charge of moldable material, herein shown as glass, is placed within mold 10 in molten form, the latter is rotated at high speeds thereby spinning the material and by the centrifugal force which is developed causes it to spread and travel upwardly over the inner wall surface of mold 10. The upper portion 14, generally referred to as the moil, with its irregularly-shaped surface must be removed.

The present invention provides means for reshaping and scoring the glass in a generally horizontal plane below moil 14, wherein the reshaping accomplishes a grooving and plowing action which forces downwardly and inwardly to form an annularly thickened portion on the body portion side subsequently to be formed into a suitable wide seal edge. This grooving, or reshaping as well as the scoring of the glass 11 downwardly of moil 14 along a line of severance, is accomplished by a device 16. This device is mounted on a vertical shaft 17 which is screw threaded throughout its length to permit vertical adjustment thereof. An adjusting ring 18 threaded on shaft 17 is mounted in a bracket 19, the latter being integral with device 16. Ring 18 serves as a fine adjustment means for vertically positioning the grooving and scoring tools subsequently to be described. Shaft 17 is mounted in a frame or arm 21 serving as a carrier for device 16, the arm being movable up and down for lowering said device into operative position within mold 10 and for lifting it from its operative position such as shown by the broken line position 16'. Frame or arm 21 may also be moved laterally to position the device at the side of mold 10. Shaft 17 is adjustable up and down within carrier 21 and is held in a prescribed position by nuts 22 and 23. Spline keys 25 in a keyway 26 may be used to prevent oscillation or rotating movement of the apparatus relative to shaft 17.

Two glassworking tools or discs 27 and 28 are operatively connected respectively to air cylinders 29 and 30 by which they are yieldingly held under pneumatic pressure against the glass during the reshaping and scoring operation. Tools 27 and 28 are carried in a yoke 31 by pivot pins 32 on which the tools are mounted for free rotation. The piston rod 34 of the motor 29 has attached thereto at its outer end a fork 35 which straddles tool 27 and through which pivot pin 32 extends and pivotally connects rod 34 to yoke 31. Piston rod 36 of motor 30 is connected to yoke 31 through a pair of links 37.

Air under pressure for operating the two air motors is supplied through a pipe 38, to cylinder 29 and projects the reshaping tool 27 to operative position while the air in front of the motor piston 41 is exhausted through pipe 39. Air pressure for operating cylinder 30 is transmitted from cylinder 29 through a port 40 which provides a communication between cylinders 29 and 30 respectively, thereby projecting scoring tool 28 into operative position with the freshly-molded glass 11.

The device 16 which operates upon glassworking tools 27 and 28 respectively, and as generally described above, is old in the art as exemplified in U.S. Letters Patent 2,840,952. Unlike the prior art, however, wherein the glass working tools merely serve to groove and score the interior surface of the hollow glass article to facilitate the separation of the moil portion by thermally-induced stresses, this invention contemplates the concurrent formation of a radially-thickened annular ring on the funnel portion. This ring portion will then be further processed to produce a wide seal edge surface which greatly facilitates the sealing of a face plate to the funnel portion of a cathode-ray tube, and especially these component parts of a polychromatic television picture tube.

Referring to FIG. 4, there is shown the preferred embodiment of a reshaping tool 27 capable of grooving and forming the annularly-thickened ring as contemplated in this invention. Tool 27 generally comprises a flat circular wheel having a substantially planar, upper surface 50 whose outer margin or extremity defines an edge 51. Juncturing edge 51 is an annular, inwardly and downwardly extending plowing surface 52 which merges with a generally vertically disposed, shaping surface 53. In mounting the respective tools 27 and 28 upon yoke 31, it is preferred that edge 51 of the reshaping tool and beveled edge 28' of the conventional scoring tool 28 be positioned in horizontal registry. Thus in operation, after gears 12 and 13 have rotated mold 10 causing a charge of molten glass to be forced upwardly along the inner mold surfaces, thereby defining a hollow generally frusto-conical shaped glass article 11, device 16 is positioned within the mold and air is supplied to motors 29 and 30 which in turn bring glass working tools 27 and 28 into operative engagement with the then more slowly rotating article 11. The outwardly-projecting edge 51 of reshaping tool 27 contacts the workable glass and, by means of plowing surface 52, forces the adjacent glass downwardly and inwardly along the plowing surface. This downwardly moving glass contacts shaping surface 53 which serves to define the inner surface of the resulting annularly-thickened ring 54. As the tools, 27 and 28 respectively, are in horizontal tandem alignment, the latter trailing tool tracks in the root of re-entrant recess 55 formed in the glass by the former reshaping tool, and serves to impart a fine, hairline score or series of small fissures in the set up glass, whereby the article may be thermally severed by so-called "ringing-off," a method well known in thhe art. Since only that portion of the glass existing upwardly of re-entrant recess 55 is removed in the "ring-off" step, the desired wide seal edge 56 is obtained by grinding away that relatively small annular section of glass existing upwardly of the annularly-thickened ring 54.

FIG. 5 shows an alternate embodiment of the reshaping tool. Here tool 27' comprises a substantially planar upper surface 50' whose outer margin merges with a plowing surface 52' which extends outwardly and upwardly from the lower tool surface 57', thus defining an outwardly-projecting annular beveled edge 51'. Like the embodiment of FIG. 4, upon edge 51' contacting the workable glass, the latter will be forced downwardly and inwardly along plowing surface 52'. Because no shaping surface is provided on reshaping tool 27', the downwardly moving glass will proceed to lower tool surface 57' and will extend slightly inwardly therealong to form an inwardly projecting bead 54'. After the moil has been subsequently removed by thermally-induced stresses, which as noted supra is facilitated by the tracking of scoring tool 28 in the root of re-entrant recess 55, the upper margin of the hollow frusto-conical glass article 11 is subjected to grinding cycle. This grinding produces the desired substantially-planar wide seal edge 56' by removing the glass existing upwardly of the annularly thickened bead 54 and, thereby greatly increases the ease with which a faceplate may be sealed to the funnel.

While the invention as described above contemplates the use of a tracking-scoring tool to facilitate the removal of a moil by thermally-induced stresses, it is possible to utilize only the grooving-reshaping tool to accomplish this purpose, such as by rotation of the workpiece several revolutions with the single tool contacting the glass. Moreover, the formation of the hollow glass article may, in addition to the step of rotating the mold, employ a pre-pressing operation as is well known in the art.

From the foregoing, it will be apparent that the provision of a single surface, substantially inclined with respect to the axis of a glass working tool and being disposed about the outer periphery of such tool, will, as the tool is forced a substantial distance into the surface of a freshly-formed glass article to a depth of ⅔ or ¾ the normal wall thickness, by a plowing type action, force the adjacent glass downward and produce an annularly-thickened ring section. By suitable after-processing techniques, this ring is formed into a planar outer rim, or wide seal edge, for more expedient sealing of a faceplate thereto.

While a preferred embodiment of this invention has been described in detail above, it will be apparent to those skilled in the art that the embodiment may be modified. Consequently, the foregoing is to be considered exemplary, rather than limiting, and the true scope of this invention is as described in the following claims.

I claim:

1. An apparatus for simultaneously grooving and reshaping the internal surface of a hollow, generally frusto-conical-shaped glass article while said article is in a workable condition, said apparatus comprising: a generally circular, rotatably-mounted grooving and reshaping wheel having an outwardly-projecting edge and including an annular inclined plowing surface on said wheel extending downwardly and inwardly from said edge and a circumferential glass-shaping surface on said wheel merging with said plowing surface, wherein said shaping surface is generally parallel to the rotational axis of said wheel; means for progressively forcing said wheel into the internal surface of said workable glass article and means for relative rotation of said article and said wheel, whereby the edge of said wheel penetrates the article and workable glass is forced and directed by said plowing surface to said glass-shaping surface and shaped into an annular, inwardly-projecting ring which by suitable after-processing will define a wide seal edge at the upper margin of said article.

2. Apparatus for reshaping and scoring the internal surface of a workable, hollow glass article to form a ring adapted to facilitate the formation of a wide seal edge on said article, said apparatus comprising: a rotatably mounted, generally circular, leading, grooving and reshaping tool, said tool having a circumferential edge and including an annular plowing surface extending downwardly and inwardly from said edge and a generally vertically disposed reshaping surface on said tool merging with said plowing surface; a trailing, rotatably mounted, generally circular scoring tool having a beveled edge in horizontal registry with said circumferential edge of said grooving and reshaping tool; means for supporting said grooving and reshaping tool and said scoring tool in leading and trailing relationship; means for relatively rotating said article and said tools about a vertical axis; and means for progressively forcing said tools into the internal surface of said workable glass article so that said edge of said grooving and reshaping tool forms an initial groove and workable glass is forced and directed along said plowing surface to said reshaping surface and shaped into an annular ring, and the edge of said trailing scoring tool tracks in the groove of the leading tool.

References Cited

UNITED STATES PATENTS

| | | | |
|---|---|---|---|
| 1,457,491 | 6/1923 | Beebe | 63—174 |
| 2,629,206 | 2/1953 | Giffen et al. | 65—269 X |
| 2,840,952 | 7/1958 | Soubier | 65—177 |
| 3,124,444 | 3/1964 | Ritter, Jr. et al. | 65—174 X |
| 3,151,968 | 10/1964 | Wallar | 65—71 |
| 3,459,527 | 8/1969 | Peterson et al. | 65—71 X |

S. LEON BASHORE, Primary Examiner

U.S. Cl. X.R.

65—71, 105, 302